(No Model.)

C. H. MAGOON.
STEAM TRAP.

No. 318,271. Patented May 19, 1885.

Witnesses
L. D. Kelsey
Emil Harter

Chas. H. Magoon
Inventor
By Atty

UNITED STATES PATENT OFFICE.

CHARLES H. MAGOON, OF ST. JOHNSBURY, VERMONT, ASSIGNOR OF ONE-HALF TO HENRY FAIRBANKS, OF SAME PLACE.

STEAM-TRAP.

SPECIFICATION forming part of Letters Patent No. 318,271, dated May 19, 1885.

Application filed August 25, 1884. (No model.)

*To all whom it may concern:*

Be it known that I, CHARLES H. MAGOON, of St. Johnsbury, in the county of Caledonia and State of Vermont, have invented new Improvements in Steam-Traps; and I do hereby declare the following, when taken in connection with accompanying drawings, and the letters of reference marked thereon, to be a full, clear, and exact description of the same, and which said drawings constitute part of this specification, and represent, in—

Figure 1:
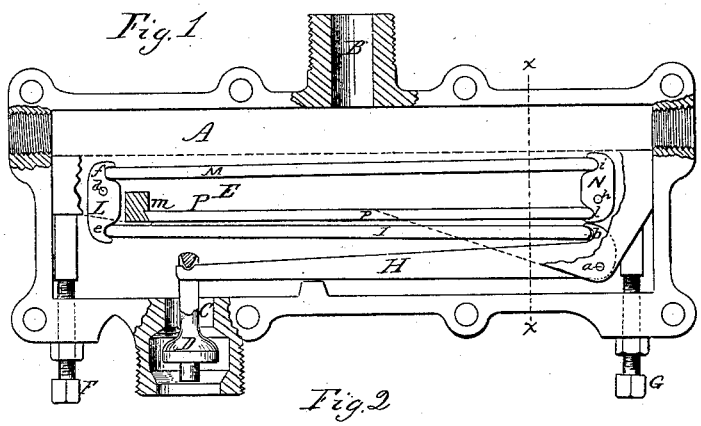
Figure 2:
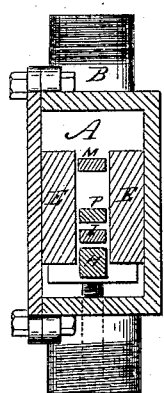
Figure 3:
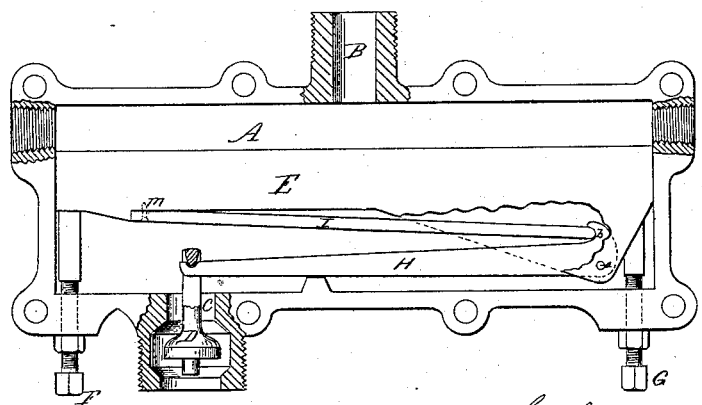

Figure 1, a longitudinal sectional view; Fig. 2, a transverse section on line $x\ x$; Fig. 3, a modification.

This invention relates to an improvement in traps for feed-water heaters, specially adapted to heaters on locomotives, but applicable to other uses where such a trap is desirable, the invention having for its object to permit the escape of the water arising from condensation, and to close the trap so soon as the water shall have escaped, the operation of the valve being automatic under the action of the hot steam or cooler water arising from condensation; and the invention consists in a chamber, into which steam may enter from the heater or otherwise, having a system of rods and levers arranged therein in connection with the valve, whereby the expansion of the rods under the action of the hot steam will force the valve to its closed position, and the contraction of the rods under the action of the water at a lower temperature than the steam will cause the valve to open and the water to escape until steam shall again act upon the rods to close the valve, and as more fully hereinafter described.

A represents a chamber into which steam may enter, say, through an inlet, B. This chamber is arranged in connection with the heater at a low point, or in communication with a system of steam-pipes, or wherever it is desirable to permit condensation to escape, and so that condensation will pass into the chamber A.

In the bottom of the chamber A is an opening, C, to which a valve, D, is fitted.

Within the chamber a frame, E, is arranged and supported upon adjusting-screws F G, and so that the frame may be raised or lowered as occasion may require. In this frame a lever, H, is hung upon a pivot, $a$. Upon the free end of the longer arm the valve D is hung. The shorter arm is constructed to form a seat, $b$, in which one end of a rod, I, will rest, this rod being nearly parallel with the lever H.

In the frame, at the opposite end, a lever, L, is hung upon a pivot, $d$. The lever is constructed with a seat, $e$, in which the other end of the rod I will take a bearing. The lever L is constructed with a seat, $f$, above its pivot, or upon the opposite side to the seat $e$, and into that seat one end of a rod, M, is arranged.

At the opposite end of the frame a lever, N, is hung upon a pivot, $h$. This lever N is constructed above its pivot to form a seat, $i$, into which the other end of the rod M will bear. Below the pivot $h$ the lever N is constructed with a second seat, $l$, into which one end of a rod, P, takes its bearing, the other end of the rod made fast to the frame, as at $m$. This completes the structure.

Steam is admitted to the chamber A, and under its influence the several rods, I, M, and P, expand. The expansion of the rod P turns the lever N, and moves the rod M accordingly toward the lever L. At the same time the rod M is expanded and imparts to the lever L a movement at least equal to the expansion of both rods P M, which expansion is communicated to the rod I, and increased by the expansion of the rod I. It (the rod I) communicates the expansion of all rods to the bearing $b$ on the lever H, thereby turning the lever H, causing the longer arm to rise until the valve D comes to its seat to close the opening C, as indicated in broken lines. If after the rods have reached their extreme expansion the valve should not have reached its seat, so as to close the opening C, then the frame is raised by the screws F G until the valve comes to a bearing. Should the valve close the opening too soon, then the frame, with the levers it carries, is lowered. By means of the adjusting-screws, therefore, the valve may be adjusted with relation to its seat so as to close when a certain temperature is reached. The valve being thus closed the condensation of steam passes into the trap, in the usual manner for such traps, until the chamber is partially filled, or so as to surround the rods to a greater or less extent with the water until that water, being of a lower degree of heat than the steam, causes the rods to contract and reverse their action, which reverse action drops the valve and opens the passage C to permit the water to escape, and as it so escapes steam will again come into contact with the several rods, cause them to expand, and close the valve as before. Therefore between the inflow of steam and the condensation of water the action of the rods and levers is automatic to open the valve when condensation has accumulated and close that valve when the condensation has escaped.

While I prefer to arrange the frame carrying the levers in the chamber so as to be adjustable, it will be evident that the levers may be arranged without such adjustment.

This trap, while specially designed for feed-water-heaters, is equally applicable to a system of pipes through which steam passes, the trap being arranged at a low point, so that the condensation may flow therein.

The number of rods and levers may be increased or diminished—say, for illustration, one expanding rod, I, may be employed, one end of the rod fixed to the frame, the other resting in the seat $b$ of the lever H, as seen in Fig. 3. I therefore do not wish to limit my invention to any particular number of expansion-rods.

The expansion-rods may be made of any suitable material, preferring that which will give the greatest expansion with the least variation in temperature.

I claim—

1. The combination of the chamber A, constructed with an inlet, B, and outlet C, the frame E, arranged in said chamber upon adjusting-screws F G, the lever H, hung in said frame, the valve D, hung upon said lever H, and an expansion-rod, one end taking its bearing in the shorter arm of said lever H, the other resisted by said frame, substantially as described.

2. The combination of the chamber A, constructed with the inlet B and outlet C, the frame E, arranged in said chamber, the lever H, hung in said frame, the valve D, hung upon the longer arm of said lever H, and a system of expansion-rods and levers, L N, arranged as shown in said frame, one end resisted by the frame, the other taking a bearing on the shorter arm of said lever H, substantially as described.

3. The combination of the chamber A, constructed with the inlet B and outlet C, the frame E, arranged in said chamber, the lever H, hung in said frame, the valve D, hung upon the longer arm of said lever H, a system of expansion-rods and levers arranged in said frame, one extreme resisted by the frame, the other extreme taking a bearing on the shorter arm of said lever H, and the adjusting-screws F G, whereby the position of the frame, levers, and valve may be adjusted with relation to the opening C, substantially as described.

CHAS. H. MAGOON.

Witnesses:
ELISHA MAY,
GEO. D. SEYMOUR.